(12) United States Patent
Stevens et al.

(10) Patent No.: US 11,087,235 B2
(45) Date of Patent: Aug. 10, 2021

(54) COHORT CONSENSUS APPROACH TO MANUFACTURING WATSON Q AND A PIPELINE TRAINING CASES FROM HISTORICAL DATA

(71) Applicant: International Business Machines Corporation, Armonk, NY (US)

(72) Inventors: Richard J. Stevens, Monkton, VT (US); Fernando J. Suarez Saiz, Armonk, NY (US)

(73) Assignee: International Business Machines Corporation, Armonk, NY (US)

( * ) Notice: Subject to any disclaimer, the term of this patent is extended or adjusted under 35 U.S.C. 154(b) by 708 days.

(21) Appl. No.: 15/225,880

(22) Filed: Aug. 2, 2016

(65) Prior Publication Data

US 2018/0039904 A1 Feb. 8, 2018

(51) Int. Cl.
*G06N 20/00* (2019.01)
*G06N 5/04* (2006.01)

(52) U.S. Cl.
CPC .............. *G06N 20/00* (2019.01); *G06N 5/04* (2013.01)

(58) Field of Classification Search
CPC ................................ G06N 20/00; G06N 5/04
See application file for complete search history.

(56) References Cited

U.S. PATENT DOCUMENTS

| 5,908,383 A | 6/1999 | Brynjestad |
| 7,761,447 B2 | 7/2010 | Brill et al. |
| 8,126,736 B2 | 2/2012 | Anderson |
| 8,250,008 B1 | 8/2012 | Cao et al. |
| 9,747,552 B2 | 8/2017 | Clark |
| 9,818,062 B2 | 11/2017 | Clark |
| 9,836,693 B2 | 12/2017 | Clark |
| 9,842,296 B2 | 12/2017 | Clark |

(Continued)

OTHER PUBLICATIONS

Ana Cristina Mendes and Luı́sa Coheur, An Approach to Answer Selection in Question-Answering Based on Semantic Relations, 2011,Twenty-Second International Joint Conference on Artificial Intelligence, p. 1852-1857 (Year: 2011).*

(Continued)

*Primary Examiner* — Alexey Shmatov
*Assistant Examiner* — Ahsif A. Sheikh
(74) *Attorney, Agent, or Firm* — Reza Sarbakhsh

(57) ABSTRACT

A system rapidly produces training cases for machine based learning by automatically creating training cases from a database of historical data. The system determines a plurality of attributes relevant to each of the training cases. The system identifies a first attribute of the plurality of attributes as an issue, and a second attribute of the plurality attributes as a response to the issue. The system identifies a plurality of cohort members from the database of historical data, where each cohort member comprises cohort member attributes that match a subset of the plurality of attributes. The system analyzes the cohort member attributes of each of the plurality of cohort members to identify the most frequent responses to the issue. The system creates the training cases where each training case comprises the issue and the most frequent responses. The system then trains a machine based learning system using the training cases.

20 Claims, 3 Drawing Sheets

(56) References Cited

U.S. PATENT DOCUMENTS

| | | | |
|---|---|---|---|
| 2002/0029157 A1* | 3/2002 | Marchosky | G06F 19/3418 |
| | | | 705/3 |
| 2006/0281977 A1 | 12/2006 | Soppet | |
| 2008/0208914 A1 | 8/2008 | Navani | |
| 2011/0201900 A1 | 8/2011 | Zhang | |
| 2011/0251243 A1 | 10/2011 | Tucker | |
| 2012/0078837 A1* | 3/2012 | Bagchi | G06F 40/169 |
| | | | 706/52 |
| 2012/0185266 A1 | 7/2012 | Trifunov | |
| 2013/0013542 A1 | 1/2013 | Sen et al. | |
| 2013/0085773 A1 | 4/2013 | Yao | |
| 2013/0085980 A1 | 4/2013 | Alemi | |
| 2013/0185231 A1 | 7/2013 | Baras | |
| 2014/0358890 A1* | 12/2014 | Chen | G06F 16/3329 |
| | | | 707/710 |
| 2015/0193588 A1* | 7/2015 | Nemoto | G06F 19/00 |
| | | | 705/2 |
| 2015/0254353 A1* | 9/2015 | Gulwani | G06F 16/951 |
| | | | 707/706 |
| 2016/0078351 A1 | 3/2016 | Clark | |
| 2016/0078355 A1 | 3/2016 | Clark | |
| 2016/0247071 A1 | 8/2016 | Clark | |
| 2016/0247073 A1 | 8/2016 | Clark | |

OTHER PUBLICATIONS

Ana Cristina Mendes and Lu isa Coheur, An Approach to Answer Selection in Question-Answering Based on Semantic Relations, 2011,Twenty-Second International Joint Conference on Artificial Intelligence, p. 1852-1857 (Year: 2011).*

Nicholson ("Learning without case records: a mapping of the repertory grid technique onto knowledge acquisition from examples", IBM United Kingdom Laboratories Ltd., Winchester, UK, Expert Systems, vol. 9, No. 2, 79-87, May 1992).

Ahmed et al. ("Case-based Reasoning for Diagnosis of Stress using Enhanced Cosine and Fuzzy Similarity" 2008).

Celi et al. ("Dynamic Clinical Data Mining: Search Engine-Based Decision Support" 2014).

Fukumoto et al., Interactive Document Expansion for Answer Extraction of Question Answering System, 17th Int'l Conference in Knowledge Based and Intelligent Information and Engineering Systems, 2013.

IBM: List of IBM Patents or Patent Applications Treated as Related (Appendix P), Mar. 10, 2021, 2 pages.

Lally et al., "WatsonPaths: Scenario-based Question Answering and Inference over Unstructured Information", Sep. 17, 2014.

Roitman et al., "Exploratory Search Over Social-Medical Data", 2011.

* cited by examiner

COHORT CONSENSUS APPROACH TO MANUFACTURING WATSON Q AND A PIPELINE TRAINING CASES FROM HISTORICAL DATA

BACKGROUND

The development of machine based learning systems requires many training cases that train the system how to answer correctly when presented with similar cases. One source of training cases comes from one on one interviews with experts in the field. This method is tedious, and can produce biased answers from the experts. Also, experts may answer based on the most memorable cases, and not necessarily the more frequent and ordinary cases. Therefore, it would be helpful to have way to rapidly produce unbiased training cases that represent the consensus of experts in a given field.

SUMMARY

According to an embodiment of the present invention, in a method for rapidly producing training cases for machine based learning, the method automatically creates one or more training cases for machine based learning from a database of historical data. The method determines a plurality of attributes relevant to each of the training cases. The method identifies a first attribute of the plurality of attributes as an issue, and identifies a second attribute of the plurality attributes as a response to the issue. The method identifies a plurality of cohort members from the database of historical data, where each cohort member comprises cohort member attributes that match a subset of the plurality of attributes. The method analyzes the cohort member attributes of each of the plurality of cohort members to identify a plurality of most frequent responses to the issue. The method creates one or more training cases where each training case comprises the issue and the plurality of most frequent responses. The method trains a machine based learning system using one or more training cases. In an example embodiment, the method updates at least one of the plurality of cohort members and the cohort member attributes as new data is inserted into the database of historical data. In another example embodiment, the method continues to train the machine based learning system as new data is inserted into the database of historical data and/or at least one additional database of historical data is added to the database of historical data.

In an example embodiment, when the method automatically creates one or more training cases for machine based learning from the database of historical data, the method selects the database of historical data from a plurality of databases of historical data to produce training cases that reflect a consensus associated with the selected database.

In an example embodiment, when the method automatically creates one or more training cases for machine based learning from the database of historical data, the method compiles the database of historical data from a plurality of databases to reflect a consensus associated with the plurality of databases.

In an example embodiment, when the method identifies the second attribute of the plurality attributes as the response to the issue, the method identifies the issue as having at least two suitable responses.

In an example embodiment, when the method identifies the plurality of cohort members from the database of historical data, where each cohort member comprises cohort member attributes that match a subset of the plurality of attributes, the method determines a number of attributes relevant to the training case that will result in suitable responses to the issue.

In an example embodiment, when the method identifies the plurality of cohort members from the database of historical data, where each cohort member comprises cohort member attributes that match a subset of the plurality of attributes, the method defines a range of values associated with at least one of the cohort member attributes that match at least one of the plurality of attributes.

In an example embodiment, when the method analyzes the cohort member attributes of each of the plurality of cohort members to identify the plurality of most frequent responses to the issue, the method ranks each of the plurality of most frequent responses within the plurality of most frequent responses.

In an example embodiment, when the method analyzes the cohort member attributes of each of the plurality of cohort members to identify the plurality of most frequent responses to the issue, the method identifies a threshold of suitable responses to the issue. The method identifies the plurality of most frequent responses as those responses that meet or exceed the threshold.

In an example embodiment, when the method creates one or more training cases where each training case comprises the issue and the plurality of most frequent responses, the method identifies the historical database as a database of patient medical records. The method identifies the issue as a medical issue, and identifies the response as a therapy for the medical issue. The method then trains the machine based learning system to determine suitable therapies for the medical issue.

In an example embodiment, when the method trains the machine based learning system to determine suitable therapies for the medical issue, the method trains the machine based learning system to determine suitable therapies for the medical issue, where the suitable therapies reflect a consensus among medical providers while reducing medical provider bias.

DETAILED DESCRIPTION

Figure 1:
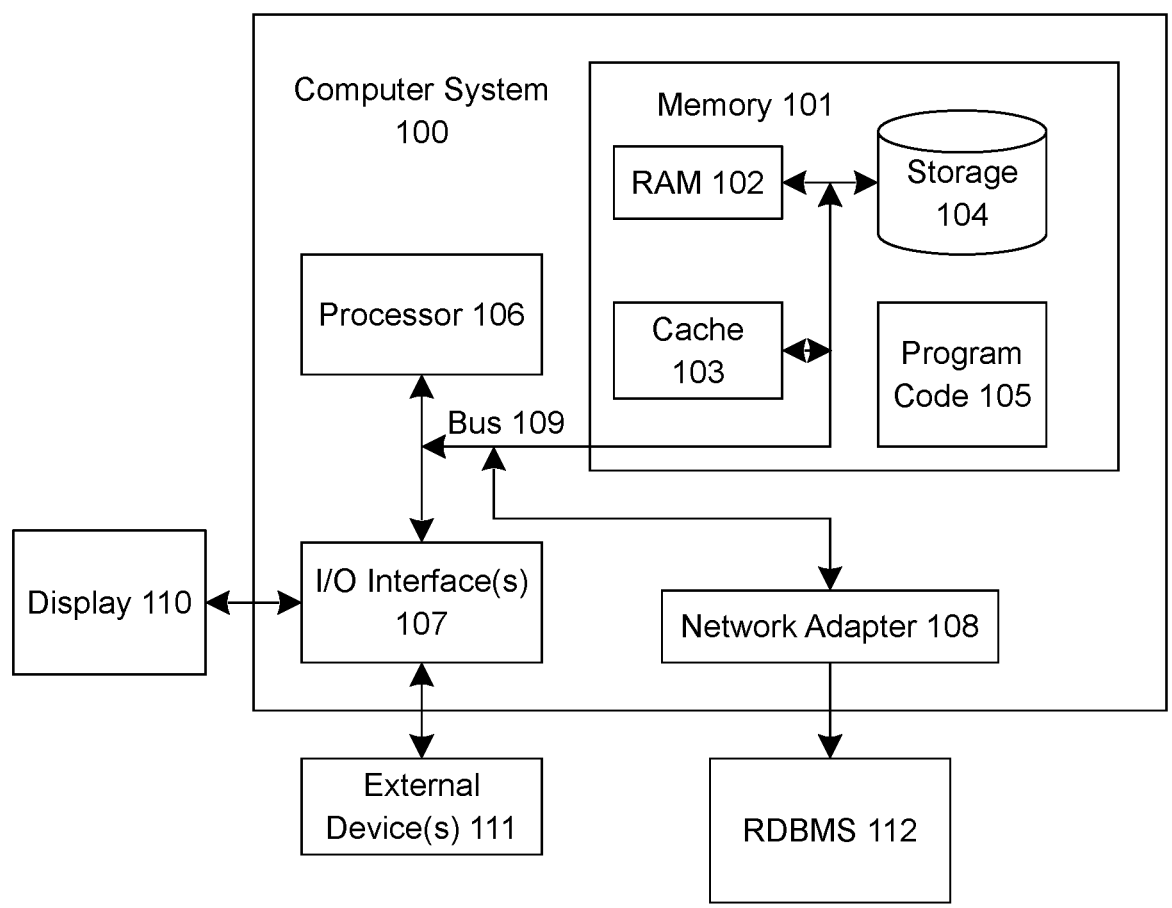
FIG. 1 illustrates an embodiment of a system for rapidly producing training cases for machine based learning, according to embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 illustrates a system for rapidly producing training cases for machine based learning according to embodiments disclosed herein. The computer system 100 is operationally coupled to a processor or processing units 106, a memory 101, and a bus 109 that couples various system components, including the memory 101 to the processor 106. The bus 109 represents one or more of any of several types of bus structure, including a memory bus or memory controller, a peripheral bus, an accelerated graphics port, and a processor or local bus using any of a variety of bus architectures. The memory 101 may include computer readable media in the form of volatile memory, such as random access memory (RAM) 102 or cache memory 103, or non-volatile storage media 104. The memory 101 may include at least one program product having a set of at least one program code module 105 that are configured to carry out the functions of embodiment of the present invention when executed by the processor 106. The computer system 100 may also communicate with one or more external devices 111, such as a display 110, via I/O interfaces 107. The computer system 100 may communicate with one or more networks via network adapter 108. The computer system 100 may communicate with one or more databases 112 via network adapter 108.

Figure 2:
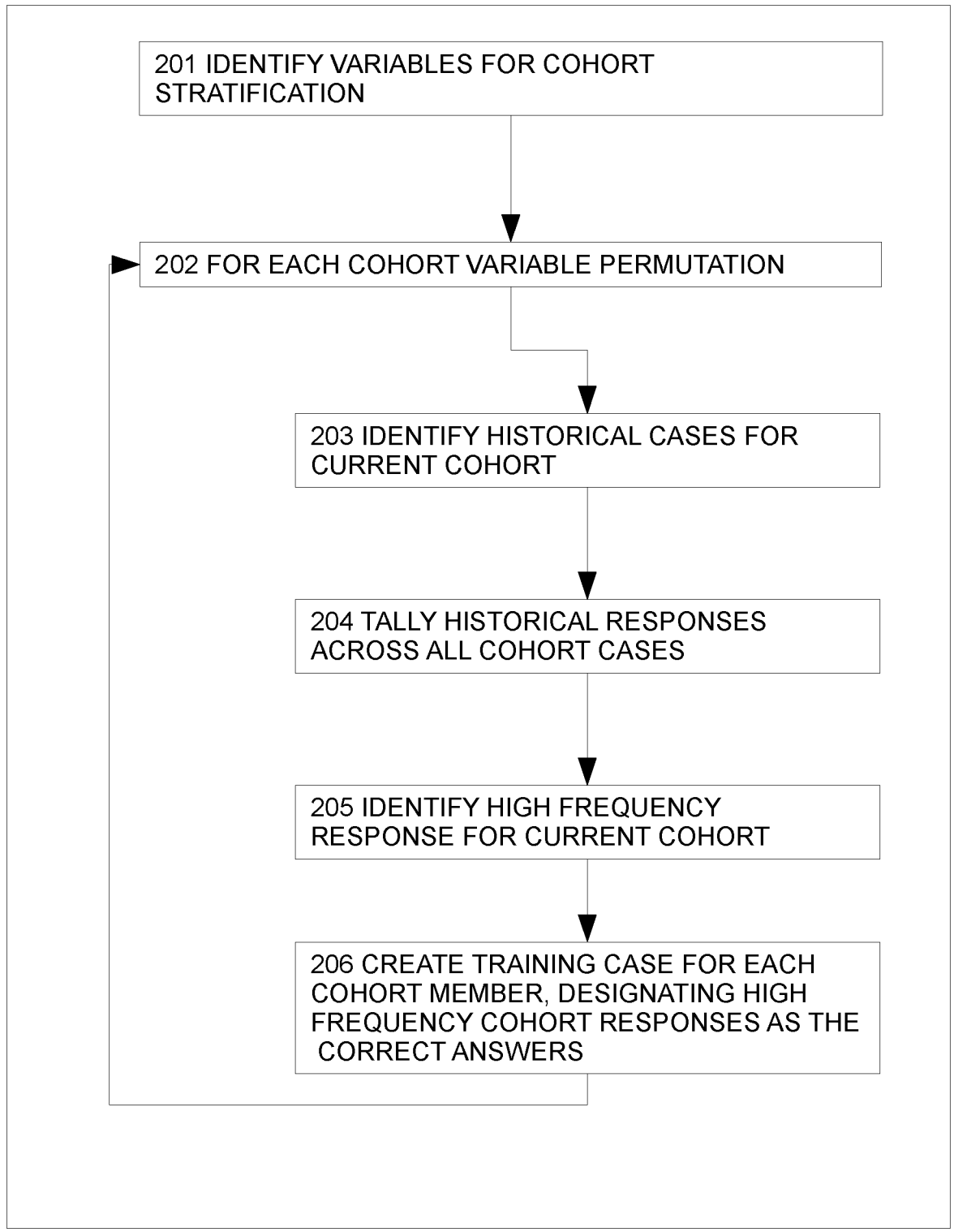
FIG. 2 illustrates a flowchart of an embodiment of a method for rapidly producing training cases for machine based learning.

FIG. 2 illustrates a flowchart of an embodiment of a method for rapidly producing training cases for machine based learning. In this example embodiment, the training cases are for a machine based learning system geared toward identifying therapies for medical conditions. At 201, the method identifies variables for cohort stratification. The method identifies key variables to be used for historical cohort identification. At 202, for each cohort variable permutation, the method iterates overall the permutations of the cohort identification attributes. At 203, the method identifies historical cases for the current cohort. The method identifies cohort members matching the current set of attributes (i.e., all historical patients having that combination of clinical status values). At 204, the method tallies historical responses across all cohort cases. The method identifies therapies given to cohort members of the current cohort and counts the number of times each therapy was given. At 205, the method identifies high frequency responses for the current cohort. The method may establish a suitable threshold to distinguish the high frequency responses from all the responses. At 206, the method creates training cases for each cohort member, designating the high frequency responses as the correct answers for each training case (meaning each training case has a plurality of correct answers/responses).

Figure 3:
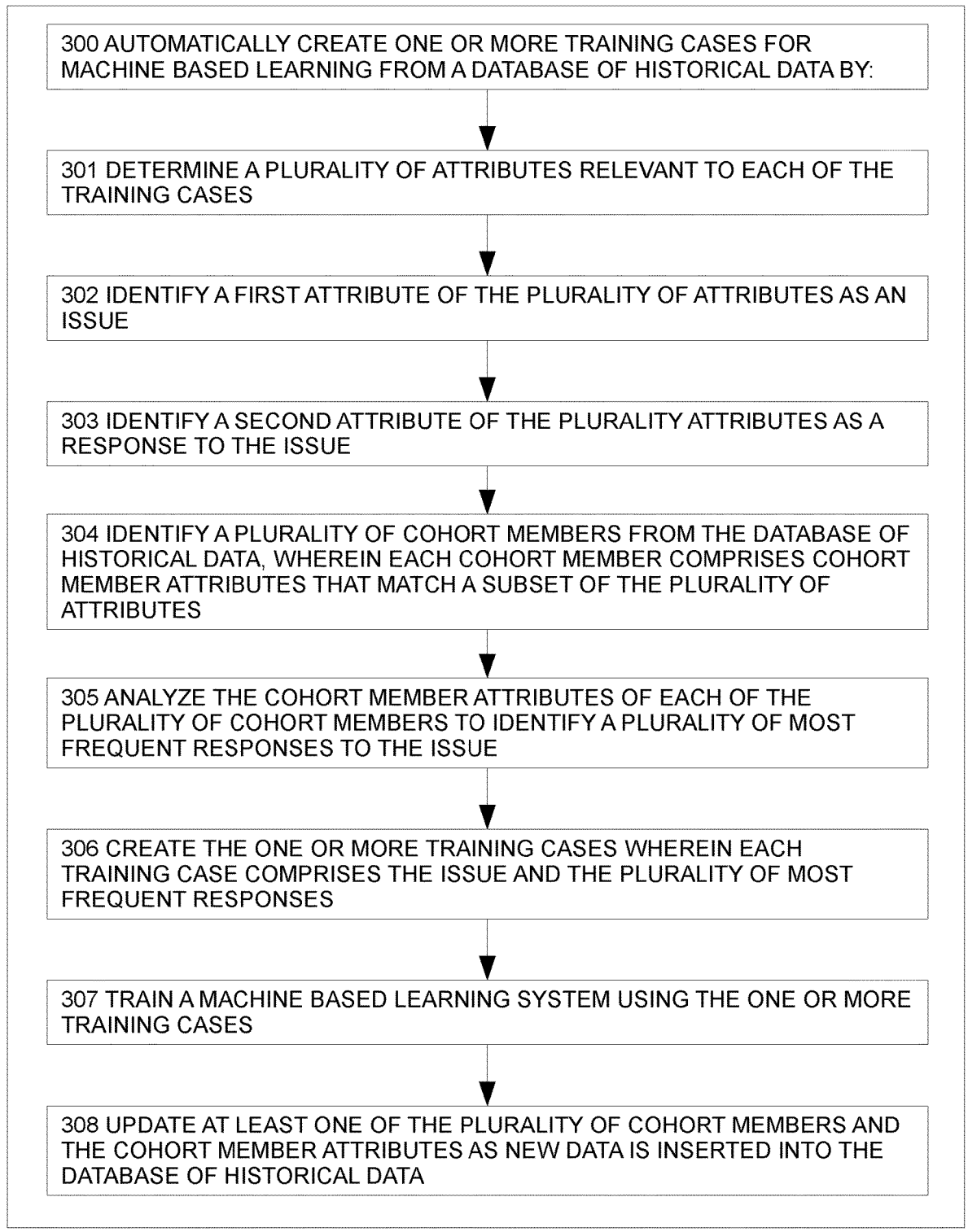
FIG. 3 is a flowchart illustrating an embodiment of a method for rapidly producing training cases for machine based learning, according to embodiments disclosed herein.

FIG. 3 illustrates an embodiment of a method for rapidly producing training cases for machine based learning. At 300, the method automatically creates one or more training cases for machine based learning from a database of historical data. The method automatically and rapidly creates one or more training cases to supply the machine based learning system with a large volume of high quality training cases. Machine based learning systems are trained using a supervised learning approached where the system is given a set of requests with defined, correct responses (i.e., training cases). Various algorithms are used to enable the machine based learning system to learn from those training cases so that it can respond accurately to other requests that are consistent with, but not part of the set of training cases used to train the machine based learning system. Some machine based learning system training scenarios involve training cases that have a single request, but multiple correct responses associated with that single request. For example, a wealth management system may provide multiple correct responses to a single wealth management related request. When the training cases involve medical requests (such as determining a correct therapy for a medical condition), there may be more than one correct response. Having multiple correct responses to a single request exponentially increases the number of training cases needed to train a machine based learning system since the system needs to incorporate multiple correct responses into the machine learning algorithm. Traditionally, these training cases are gathered through one on one interviews with medical experts. This process is tedious, and challenging when dealing with busy medical experts. This process also runs the risk of producing training cases that are tainted with the expert's bias rather than producing training cases that represent a consensus among the experts. For example, during the one on one interviews, the expert may answer the request (such as, "What therapy do you prescribe for this particular medical issue?") with the most memorable/favorite/unique patient cases in mind, rather than the more ordinary (and more frequent) patient cases. Additionally, the training cases produced are the product of the responses of the few experts interviewed, and do not reflect the consensus of the medical community as a whole. Embodiments disclosed herein automatically and rapidly create a very large volume of high quality training cases that require very little development time and very little time commitment. The training cases are created through an automated cohort-based analysis of historical cases. The method can be applied to any domain and/or industry where there is a set of historical data available that can be stratified into different groups that yield similar responses from a machine based learning system.

At 301, the method automatically creates one or more training cases by determining a plurality of attributes relevant to each of the training cases. In an example embodiment, the attributes may include a request and a response. For a medical training case, the attributes may include a medical issue (i.e., the request), and a therapy that is prescribed for the medical issue (i.e., the response). The attributes may also include symptoms and/or demographics associated with patients who experience the medical issue.

At 302, the method identifies a first attribute of the plurality of attributes as an issue. As noted above, in the case of a medical training case, the first attribute may be the medical issue.

At 303, the method identifies a second attribute of the plurality attributes as a response to the issue. In the case of a medical training case, the second attribute may be a response to the medical issue. Some training cases may involve one issue that has multiple responses. The issue may be a medical condition, and the multiple responses may be multiple therapies that are most prescribed for the medical condition.

At 304, the method identifies a plurality of cohort members from the database of historical data, where each cohort member comprises cohort member attributes that a subset of match the plurality of attributes. In an example embodiment, the database of historical records may be electronic patient records. As noted above, the issue may be a medical condition, for example, cancer. The method identifies key variables used to identify patients with a similar clinical status, for example, such as diagnosis, histology, cancer stage, line of treatment, age, specific genetic mutations, patient outcome, etc. The method then iterates over all permutations of these cohort identification attributes. For each combination of attributes (i.e., each cohort), the method identifies cohort members that match a subset of the current set of attributes, meaning all historical patients having that combination of clinical status values. In an example embodiment, the method performs a database search on the database of historical data using a database management programming language.

At 305, the method analyzes the cohort member attributes of each of the plurality of cohort members to identify a plurality of most frequent responses to the issue. In an example embodiment, the method identifies the therapies given to the cohort members of the current cohort (i.e., the cohort currently being analyzed) and counts the number of times each therapy was given. The method then identifies the highest frequency therapies given across the current cohort. In an example embodiment, the method performs a database retrieval to obtain cohort member data and cohort member attribute data from the database of historical data. Any programming language may be used to manage the data within the database of historical data.

At 306, the method automatically creates one or more training cases where each training case comprises the issue and the plurality of most frequent responses. In an example embodiment, for each of the cohorts identified (i.e., each combination of attributes identified), the method creates a training case, and identifies the highest frequency therapies given as the responses for the training case. The highest frequency therapies are also most likely the therapies that have a proven record of positive outcomes for the patients. In another example embodiment, it is possible to have a training case with only one most frequent response if the responses for a particular cohort were very uniform (i.e., all the patients in the cohort received the exact same therapy).

At 307, the method trains a machine based learning system using one or more training cases. The method automatically and rapidly creates a large number of training cases that represent the consensus of therapies given. The training cases are very comprehensive in that they span all permutations of the variables chosen for cohort stratification. In an example embodiment, the method runs the machine based learning system using one or more training cases created from the electronic database of medical records.

At 308, the method updates at least one of the plurality of cohort members and the cohort member attributes as new data is inserted into the database of historical data. In an example embodiment, as new data (new and/or updated electronic patient records) is entered into the medical database, the method automatically updates at least one of the plurality of cohort members and the cohort members. The training cases are automatically updated with new responses as the consensus of recommended therapies adapts and changes. Thus, when a new therapy is introduced, it is associated with one or more cohorts and the results of the new therapy are automatically incorporated into the method's analysis of cohort attributes. As the new therapy is incorporated into the training cases, patient outcomes resulting from the new therapy are compared to existing therapies. The resulting data is real world practice, not hypothetical/research trial data.

In an example embodiment, the method continues to train the machine based learning system as new data is inserted into the database of historical data, and/or at least one additional database of historical data is added to the database of historical data. New data in the form of new and/or updated electronic patient records may be continually added. New databases may be added in the form of patient records from different medical institutions, hospitals, etc. As new data is added to the database of historical data and as new databases are added, the method automatically and rapidly creates new training cases that are used to continue to train the machine based learning system.

In an example embodiment, when the method automatically creates one or more training cases for machine based learning from the database of historical data, the method selects the database of historical data from a plurality of databases of historical data to produce training cases that reflect a consensus associated with the selected database. The method may select a particular database to create training cases that reflect the consensus among the data in the selected database. For example, the method may select a database that contains electronic medical records of a particular renown cancer treatment center to create training cases that reflect the consensus among the experts at that institution, or the established treatment guidelines associated with that institution.

In an example embodiment, when the method automatically creates one or more training cases for machine based learning from the database of historical data, the method compiles the database of historical data from a plurality of databases to reflect a consensus associated with the plurality of databases. For example, as the machine based learning system is expanded to include additional databases, for example, medical records from hospitals nationwide or worldwide, the resulting training cases reflect an expanded consensus of therapies for a given medical issue.

In an example embodiment, when the method identifies the second attribute of the plurality attributes as the response to the issue, the method identifies the issue as having a least two suitable responses. As noted above, some training cases have only one correct response, but other training cases, such as those related to medical issues, and proven therapies for those medical issues, may have more than one correct response. Any industry, domain, etc. where more than one correct response (such as the recommendation of an expert) exists for a request may benefit from embodiments disclosed herein.

In an example embodiment, when the method identifies the plurality of cohort members from the database of historical data, where each cohort member comprises cohort member attributes that match a subset of the plurality of attributes, the method determines a number of attributes relevant to the training case that will result in suitable responses to the issue. For example, when a medical expert determines an appropriate therapy for a medical condition, there are usually X number of clinical attributes that drive the decision for the appropriate therapy. Here, the method determines the number of attributes that will result in suitable responses to the issue.

In an example embodiment, when the method identifies the plurality of cohort members from the database of historical data, where each cohort member comprises cohort member attributes that match a subset of the plurality of attributes, the method defines a range of values associated with at least one of the cohort member attributes that match at least one of the plurality of attributes. In one example embodiment, the cohort members may contain cases that have the same values for key attribute values. In another example embodiment, there may exist a range of values for the key attribute values. In this example scenario, the method may utilize unsupervised learning (data clustering) techniques, such as a k-means algorithm, to identify cohort members that are based on similar, but not necessarily an exact match of the key attribute values.

In an example embodiment, when the method analyzes the cohort member attributes of each of the plurality of cohort members to identify the plurality of most frequent responses to the issue, the method ranks each of the plurality of most frequent responses within the plurality of most frequent responses. For example, the method may rank each of the plurality of most frequent responses with respect to the other most frequent responses.

In an example embodiment, when the method analyzes the cohort member attributes of each of the plurality of cohort members to identify the plurality of most frequent responses to the issue, the method identifies a threshold of suitable responses to the issue, and then identifies the plurality of most frequent responses as those responses that meet or exceed the threshold. For example, the method may identify a threshold that delimitates the most frequent responses from all of the responses in the cohort. The threshold may be a percentage (i.e., those cohort members where the therapy was prescribed more than X % of the time). The threshold may be a number of times the therapy was prescribed (i.e., those cohort members where the therapy was prescribed more than X times). The threshold may also be any combination of a percentage and the number of times the therapy was prescribed.

In an example embodiment, when the method creates one or more training cases where each training case comprises the issue and the plurality of most frequent responses, the method identifies the historical database as a database of electronic patient medical records. The method identifies the issue as a medical issue, and identifies the response as a therapy for the medical issue. The method then trains the machine based learning system to determine suitable therapies for the medical issue. In one example embodiment, the method forms cohorts for all historical cases (those yielding positive and non-positive outcomes) to identify the most frequent therapies within each cohort. In another example embodiment, the method forms cohorts for historical cases with positive outcomes (i.e. medical therapies that had a positive effect on the patient's issue/disease), and then identifies the most frequent therapies for the positive outcome cohorts. The method may train the machine based learning system on both the most frequently used therapies, and those therapies that have demonstrated a positive impact on the patient's disease. The method may also train the machine based learning system using the training cases developed from the therapies that have demonstrated a positive impact on the patient's disease to bias the machine based learning system to prefer therapies that lead to successful treatment of the patient's disease.

In an example embodiment, when the method trains the machine based learning system to determine suitable therapies for the medical issue, the suitable therapies reflect a consensus among medical providers while reducing medical provider bias. The training cases that are automatically created from the database of electronic medical records represent a consensus among the medical providers who treated those patients.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of rapidly producing training cases for machine based learning, the method comprising:
automatically creating one or more training cases for machine based learning from a database of historical data by:
determining a plurality of attributes relevant to each of the training cases;
identifying a first attribute of the plurality of attributes as an issue, wherein the first attribute comprises a medical issue;
identifying a second attribute of the plurality attributes as a response to the medical issue, wherein the second attribute comprises a treatment for the medical issue;
identifying cohort values associated with each patient of a plurality of patients, wherein the cohort values correspond to the plurality of attributes, and wherein the plurality of attributes comprise two or more of the medical issue, associated medical issue information, at least one treatment, associated treatment information, associated patient demographic information, and a patient outcome;
identifying a plurality of cohort groups, wherein each cohort group of the plurality of cohort groups is unique and is associated with a unique combination of cohort values and corresponding combination of attributes;
identifying a plurality of cohort members for each of the cohort groups from the database of historical data, wherein the cohort members of a particular cohort group of the plurality of cohort groups are patients associated with the same cohort values and attributes;
analyzing the cohort values of each of the cohort members of each cohort group to identify a plurality of most frequent responses to the medical issue for each cohort group, wherein the plurality of most frequent responses for each cohort group comprise the treatment for the medical issue, and wherein, for each cohort group, the identifying of the plurality of most frequent responses to the medical issue comprises:
identifying a threshold of suitable responses to the medical issue, wherein the threshold is one of a percentage or a number of times that a particular treatment was prescribed to particular cohort members of a same cohort group associated with the medical issue, and wherein the threshold distinguishes high-frequency responses from other responses of the same cohort group; and
identifying the plurality of most frequent responses as those responses of the same cohort group that meet or exceed the threshold;
creating the one or more training cases, wherein each training case comprises the medical issue and the plurality of most frequent responses; and
training a machine based learning system using the one or more training cases.

2. The method of claim 1 wherein identifying the plurality of cohort members for each of the cohort groups comprises:
identifying a combination of attributes that are unique for a particular cohort group; and
identifying cohort members associated with attributes that match at least a subset of the combination of attributes of the particular cohort group.

3. The method of claim 1 wherein the identifying the plurality of cohort members for each of the cohort groups is iterated over the plurality of cohort groups to identify cohort members associated with attributes that match at least a subset of the combination of attributes of the particular cohort group.

4. The method of claim 1 wherein automatically creating the one or more training cases for machine based learning from the database of historical data comprises:
selecting the database of historical data from a plurality of databases of historical data to produce training cases that reflect a consensus associated with the selected database.

5. The method of claim 1 wherein automatically creating the one or more training cases for machine based learning from the database of historical data comprises:
compiling the database of historical data from a plurality of databases to reflect a consensus associated with the plurality of databases.

6. The method of claim 1 wherein identifying the second attribute of the plurality attributes as the response to the issue comprises:
   identifying the issue as having at least two suitable responses.

7. The method of claim 1 wherein each cohort member comprises cohort member attributes that match a subset of the plurality of attributes, the method further comprising:
   determining a number of attributes relevant to the training case that will result in suitable responses to the issue.

8. The method of claim 1 wherein each cohort member comprises cohort member attributes that match a subset of the plurality of attributes, the method further comprising:
   defining a range of values associated with at least one of the cohort member attributes that match at least one of the plurality of attributes.

9. The method of claim 1 wherein analyzing the cohort member attributes of each of the plurality of cohort members to identify the plurality of most frequent responses to the issue comprises:
   ranking each of the plurality of most frequent responses within the plurality of most frequent responses.

10. The method of claim 1 wherein analyzing the cohort member attributes of each of the plurality of cohort members to identify the plurality of most frequent responses to the issue comprises:
    identifying the threshold of suitable responses to the issue, wherein the threshold delimitates the most frequent responses for a particular medical issue from all of the responses associated with the cohort members, and wherein the most frequent responses are treatments to the particular medical issue; and
    identifying the threshold of suitable responses to the issue.

11. The method of claim 1 wherein creating the one or more training cases wherein each training case comprises the issue and the plurality of most frequent responses comprises:
    identifying the historical database as a database of patient medical records;
    identifying the issue as a medical issue;
    identifying the response as a therapy for the medical issue; and
    training the machine based learning system to determine suitable therapies for the medical issue.

12. The method of claim 11 wherein training the machine based learning system to determine suitable therapies for the medical issue comprises:
    training the machine based learning system to determine suitable therapies for the medical issue, wherein the suitable therapies reflect a consensus among medical providers while reducing medical provider bias.

13. A computer program product for rapidly producing training cases for machine based learning, the computer program product comprising:
    a computer readable storage medium having computer readable program code embodied therewith, the program code executable by a computing processor to:
    automatically create one or more training cases for machine based learning from a database of historical data by:
    determining a plurality of attributes relevant to each of the training cases;
    identifying a first attribute of the plurality of attributes as an issue, wherein the first attribute comprises a medical issue;
    identifying a second attribute of the plurality attributes as a response to the medical issue, wherein the second attribute comprises a treatment for the medical issue;
    identifying cohort values associated with each patient of a plurality of patients, wherein the cohort values correspond to the plurality of attributes, and wherein the plurality of attributes comprise two or more of the medical issue, associated medical issue information, at least one treatment, associated treatment information, associated patient demographic information, and a patient outcome;
    identifying a plurality of cohort groups, wherein each cohort group of the plurality of cohort groups is unique and is associated with a unique combination of cohort values and corresponding combination of attributes;
    identifying a plurality of cohort members for each of the cohort groups from the database of historical data, wherein the cohort members of a particular cohort group of the plurality of cohort groups are patients associated with the same cohort values and attributes;
    analyzing the cohort values of each of the cohort members of each cohort group to identify a plurality of most frequent responses to the medical issue for each cohort group, wherein the plurality of most frequent responses for each cohort group comprise the treatment for the medical issue, and wherein, for each cohort group, the identifying of the plurality of most frequent responses to the medical issue comprises:
    identifying a threshold of suitable responses to the medical issue, wherein the threshold is one of a percentage or a number of times that a particular treatment was prescribed to particular cohort members of a same cohort group associated with the medical issue, and wherein the threshold distinguishes high-frequency responses from other responses of the same cohort group; and
    identifying the plurality of most frequent responses as those responses of the same cohort group that meet or exceed the threshold;
    creating the one or more training cases, wherein each training case comprises the medical issue and the plurality of most frequent responses; and
    training a machine based learning system using the one or more training cases.

14. The computer program product of claim 13 wherein the computer readable program code configured to identify the plurality of cohort members from the database of historical data, wherein each cohort member comprises cohort member attributes that match a subset of the plurality of attributes is further configured to:
    define a range of values associated with at least one of the cohort member attributes that match at least one of the plurality of attributes.

15. The computer program product of claim 13 wherein the computer readable program code configured to analyze the cohort member attributes of each of the plurality of cohort members to identify the plurality of most frequent responses to the issue is further configured to:
    identify a threshold of suitable responses to the issue; and
    identify the plurality of most frequent responses as those responses that meet or exceed the threshold.

16. The computer program product of claim 13 wherein the computer readable program code configured to create the one or more training cases wherein each training case comprises the issue and the plurality of most frequent responses is further configured to:

identify the historical database as a database of patient medical records;
identify the issue as a medical issue;
identify the response as a therapy for the medical issue; and
train the machine based learning system to determine suitable therapies for the medical issue.

17. A system comprising:
a computing processor; and
a computer readable storage medium operationally coupled to the processor, the computer readable storage medium having computer readable program code embodied therewith to be executed by the computing processor, the computer readable program code configured to:
automatically create one or more training cases for machine based learning from a database of historical data by:
determining a plurality of attributes relevant to each of the training cases;
identifying a first attribute of the plurality of attributes as an issue, wherein the first attribute comprises a medical issue;
identifying a second attribute of the plurality attributes as a response to the medical issue, wherein the second attribute comprises a treatment for the medical issue;
identifying cohort values associated with each patient of a plurality of patients, wherein the cohort values correspond to the plurality of attributes, and wherein the plurality of attributes comprise two or more of the medical issue, associated medical issue information, at least one treatment, associated treatment information, associated patient demographic information, and a patient outcome;
identifying a plurality of cohort groups, wherein each cohort group of the plurality of cohort groups is unique and is associated with a unique combination of cohort values and corresponding combination of attributes;
identifying a plurality of cohort members for each of the cohort groups from the database of historical data, wherein the cohort members of a particular cohort group of the plurality of cohort groups are patients associated with the same cohort values and attributes;
analyzing the cohort values of each of the cohort members of each cohort group to identify a plurality of most frequent responses to the medical issue for each cohort group, wherein the plurality of most frequent responses for each cohort group comprise the treatment for the medical issue, and wherein, for each cohort group, the identifying of the plurality of most frequent responses to the medical issue comprises:
identifying a threshold of suitable responses to the medical issue, wherein the threshold is one of a percentage or a number of times that a particular treatment was prescribed to particular cohort members of a same cohort group associated with the medical issue, and wherein the threshold distinguishes high-frequency responses from other responses of the same cohort group; and
identifying the plurality of most frequent responses as those responses of the same cohort group that meet or exceed the threshold;
creating the one or more training cases, wherein each training case comprises the medical issue and the plurality of most frequent responses; and
training a machine based learning system using the one or more training cases.

18. The system of claim 17 further configured to:
update at least one of the plurality of cohort members and the cohort member attributes as new data is inserted into the database of historical data.

19. The system of claim 17 further configured to:
continue to train the machine based learning system as at least one of:
new data is inserted into the database of historical data; and
at least one additional database of historical data is added to the database of historical data.

20. The system of claim 17 wherein the computer readable program code configured to identify the plurality of cohort members from the database of historical data, wherein each cohort member comprises cohort member attributes that match a subset of the plurality of attributes is further configured to:
determine a number of attributes relevant to the training case that will result in suitable responses to the issue.

* * * * *